United States Patent [19]
Randmer

[11] 3,770,934
[45] Nov. 6, 1973

[54] ELECTRON BEAM HEATING APPARATUS

[75] Inventor: Jacob A. Randmer, Wilton, Conn.

[73] Assignee: The Machlett Laboratories, Incorporated, Springdale, Conn.

[22] Filed: Oct. 29, 1971

[21] Appl. No.: 193,932

[52] U.S. Cl. .................. 219/121 EB, 313/82 NC
[51] Int. Cl. ............................................. B23k 15/00
[58] Field of Search .............. 219/121 R, 121 EB, 219/121 EM; 250/49.5 R; 313/82 NC

[56] References Cited
UNITED STATES PATENTS

| | | | |
|---|---|---|---|
| 3,701,915 | 10/1972 | Tsujimoto | 219/121 EB X |
| 3,278,791 | 10/1966 | Faure | 313/82 NC X |
| 3,250,842 | 5/1966 | Hikido | 219/121 EB X |
| 3,270,233 | 8/1966 | Dietrich | 219/121 EB X |
| 2,899,556 | 8/1959 | Schopper et al. | 250/49.5 |
| 3,652,821 | 3/1972 | Dietrich et al. | 219/121 EB |
| 3,040,112 | 6/1962 | Smith, Jr. | 13/31 |
| 3,655,903 | 4/1972 | Roman et al. | 219/121 EB X |
| 2,994,801 | 8/1961 | Hanks | 219/121 EB X |
| 3,105,275 | 10/1963 | Hanks | 219/121 EB X |
| 2,746,420 | 5/1956 | Steigerwald | 118/8 |

Primary Examiner—R. F. Staubly
Assistant Examiner—Gale R. Peterson
Attorney—Harold A. Murphy et al.

[57] ABSTRACT

Electron beam heating apparatus for heating a large area workpiece in a vacuumized area by electron bombardment, including means for forming and beaming a plurality of ribbon-shaped electron beams which combine into a single beam of uniform current density and large cross-section for heating the workpiece.

4 Claims, 11 Drawing Figures

ELECTRON BEAM HEATING APPARATUS

BACKGROUND OF THE INVENTION

This invention relates to apparatus which is designed to uniformly heat a relatively large area, such as 6 inches × 6 inches or 12 inches × 12 inches, for example, with a static low power density stream of electrons, and wherein the electron source is relatively easily and simply removed and replaced.

Known electron beam heating arrangements utilize spot heating with a concentrated electron beam which, if a larger than spot size area is to be heated, is scanned over the area at a relatively rapid rate, this scanning sometimes being accompanied by movement of the workpiece. Such prior devices have the advantage that the electron beam can be generated by an electron gun in a separate enclosure which is connected to the working chamber only via a relatively small aperture. The use of a separate gun enclosure permits the maintenance within the gun chamber of a pressure which may be lower and more uniform than in the work chamber, which is advantageous for maintaining cathode life and beam stability.

However, such concentrated beams also have several serious disadvantages such as the very high instantaneous surface heating of the work, the necessity to use relatively high beam accelerating voltages with the attendant strong generation of X-rays and the complications involved in deflecting the beam over a larger work area.

SUMMARY OF THE INVENTION

In accordance with the present invention, the above and other disadvantages of known prior art electron beam heating apparatus are overcome by providing a novel electron source for providing a plurality of ribbon-shaped static undeflected electron beams of relatively low power density which are directed simultaneously onto a surface of a large area workpiece by using comparatively low accelerating voltages. The series of ribbon beams are generated within a first chamber and are directed into the work chamber through relatively narrow slots which provide impedance for gas flow from the work chamber toward the electron sources.

More specifically, the workpiece or target may be suspended from the top of a work chamber or it may be supported by a suitable stand or bracket whereby the suspension or support provides a good electrical connection of the target or workpiece with the chamber. The electron sources are positioned in a separate chamber adjacent the work chamber.

The ribbon beams of electrons are focussed through slots in a separator between the chambers by means of electrostatic or magnetic fields or a combination of both. Electrode arrangements forming cylindrical electrostatic lenses are suitable for forming the ribbon beams, depending upon specific electrode voltages and beam currents.

The apparatus may be constructed in a manner where the electron beams all emanate from one side so as to impinge upon a common side of the target, or a single electron source may be located between targets and adapted to emit electrons in two directions so as to impinge upon both targets during a heating cycle.

It is important to note that in the presently described apparatus the electron beams are electrostatically focussed through the anode slots into the work chamber, particularly where the gun-to-target distances are substantial. However, where the gun-to-target distances are relatively short, focusing may be done magnetically.

Other advantageous improvements are also included in the present invention for safety, protection, or other reasons, such as, for example, the provision of a shutoff mechanism which operates to rapidly close the anode slots in case of a sudden gas burst in the work chamber, and the inclusion of special valve means to permit valving off of the electron beam source chamber from the work chamber so that either chamber can be let to air for maintenance or other purposes without affecting the vacuum in the other compartment.

BRIEF DESCRIPTION OF THE DRAWINGS

Other objects and advantages of the invention will become apparent from the following description taken in connection with the accompanying drawings, wherein.

DESCRIPTION OF THE PREFERRED EMBODIMENTS

This invention achieves uniform heating of an area of relatively large size, such as 6 inches × 6 inches, 12 inches × 12 inches or other selected size, with a static low power density electron beam. The invention will be described here as applied to a three beam structure suitable for heating an area such as 6 inches × 6 inches in size but it is to be understood that the number of electron beams may be expanded, enlarged or decreased to heat larger or smaller areas if desired.

Figure 1:
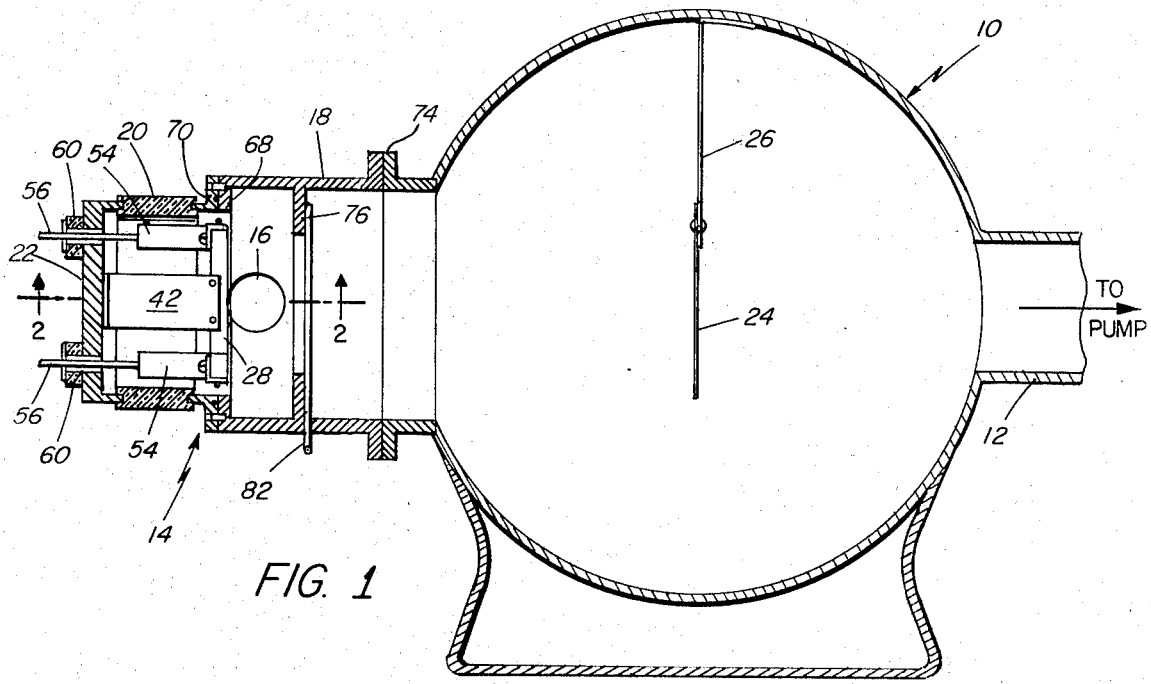
FIG. 1 is a transverse sectional view of electron beam heating apparatus according to this invention.

Referring to FIG. 1, there is shown a work chamber 10 which may be of a desired configuration having an outlet 12 at one side by which the interior of the chamber is connected to a vacuum pump (not shown). An electron gun chamber 14 is attached to one side of the work chamber 10 over an opening in the wall of the work chamber and is itself connected to a second vacuum pump (not shown) through outlet 16. Chamber 14 comprises a first wall 18, preferably cylindrical, having one end sealed to the chamber 10 as by flanges 74, for example, and having its other end sealed to one end of a dielectric cylinder 20. The other end of cylinder 20 is closed by a metal cap 22.

Cap 22 carries the electron beam-forming electrode structures, as will be described, so that when suitable electrical potential is applied to the electrodes a plurality of electron beams will be formed and will be directed into the work chamber 10 onto a selected workpiece indicated by numeral 24 in FIG. 1, which workpiece may be supported in the work chamber 10 by any suitable means, such as the support 26 which connects the workpiece electrically to the chamber, whereby the workpiece will be located in the path of electrons from the chamber 14.

The electrode structures as shown in detail in FIGS. 2–6 and include a cathode block or control electrode 28 disposed transversely within the chamber 14 and having a plurality of spaced parallel grooves 30 in its surface facing the workpiece 24. The number of grooves provided will correspond to the number of electron beams to be formed, in the described example this being three.

Extending longitudinally in each groove 30 and spaced from the walls thereof is a respective filament wire 32, the ends of which project somewhat beyond the planes of the adjacent sides of the block 28 and terminate in rigid beads, loops or enlarged portions 34. The filaments 32 are maintained constantly taut by angled cantilever springs 36 which are secured to the back surface of the cathode block 28 as by bolts 38. Springs 36 have angled portions 40 which overlie the adjacent side surfaces of the block in spaced relation with it, as shown best in FIG. 5, which angled portions 40 are slotted, as seen best in FIG. 4, to receive the respective ends of the filaments 32, with the beads 34 of the filaments being disposed on the outer sides of the angled portions 40 of the springs 36 to prevent withdrawal of the filaments from the slots. It will be apparent that the flexibility of the springs and the lengths of the filaments can be easily predetermined so that in the assembled structures the springs will maintain the filaments constantly taut during changes in temperature.

The block 28 or control electrode is held in position by brackets 42 which are welded or otherwise fixed at one end to the inner surface of cap 22 and at the other end are bolted to the block 28 so that the filaments 32 face the slotted plate 76 which forms the anode of the electrode system and are constantly maintained at a precise spaced distance therefrom and in precise alignment with the slots 78 in plate 76.

The springs 36 are spaced from the block 28 by insulators 44 (FIG. 5) and atop each spring is a copper current bypass conductor 46 which closely overlies the respective springs 36 and have angled portions 48 which overlie the angled portions 40 of the respective springs 36 and which are fixedly secured thereto as by rivets 50 or the like. This bypass conductor 46 is provided in order to preclude heating of the springs by passing the filament current directly through the spring material which is usually of high electrical resistance.

Extending across the exposed surfaces of the conductors 46 at each end of the structure is a respective bus bar 52 having a substantially U-shaped configuration, the legs 54 thereof being bolted to respective cathode terminal pins 56 which extend through openings 58 in the cap 22. Terminals 56 are fixedly mounted to cap 22 by any conventional vacuum seal connection 60 with the ends of the terminals extending outwardly of the apparatus for connection to an external filament energy supply.

When the terminals are connected to such an energy source the filaments 30 will be energized through the bus bar 52, conductors 46 and springs 36 whereupon they will individually emit copious supplies of electrons which will be directed toward the workpiece as thin ribbon beams 62 (FIG. 2) of a width corresponding to the lengths of the filaments.

The block or control electrode 28 and bolts 38 are electrically insulated from the filament current-carrying members by dielectric bushings 65 which enclose the shanks of the bolts and engage within aligned openings in insulators 44. Thus, a potential may be applied to cap 22, through brackets 42 to the block 28 whereby the slots 30 in the block will create an electrical field which will aid in forming the electrons into beams as desired.

Figure 2:
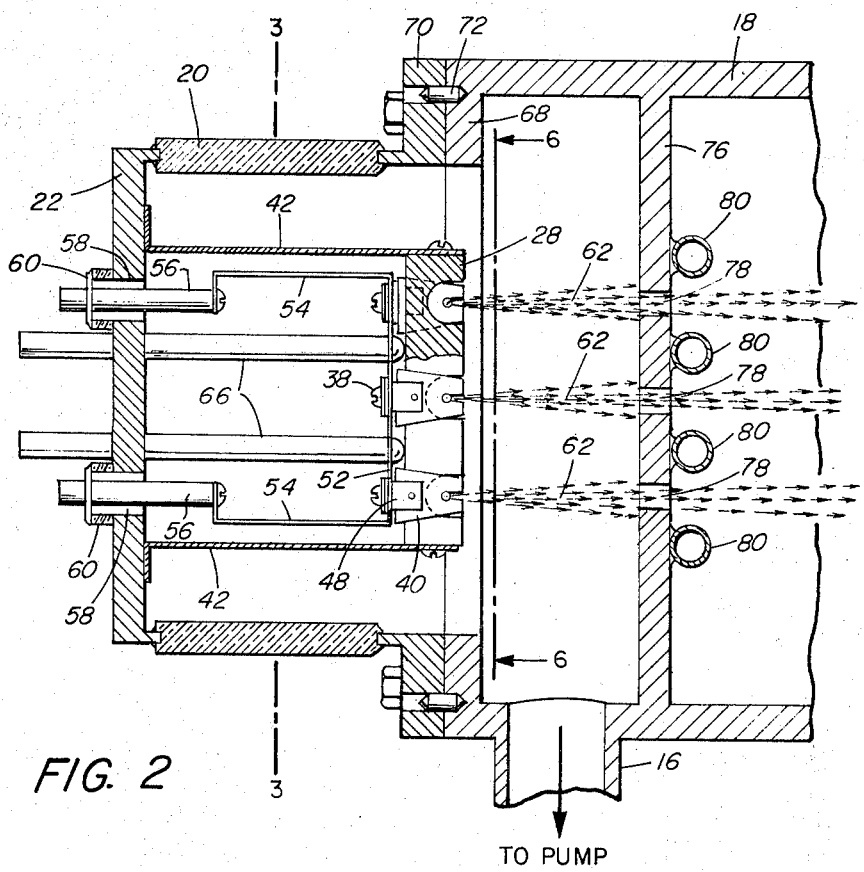
FIG. 2 is an enlarged transverse sectional view of the electron source chamber of the apparatus of FIG. 1.
Figure 3:
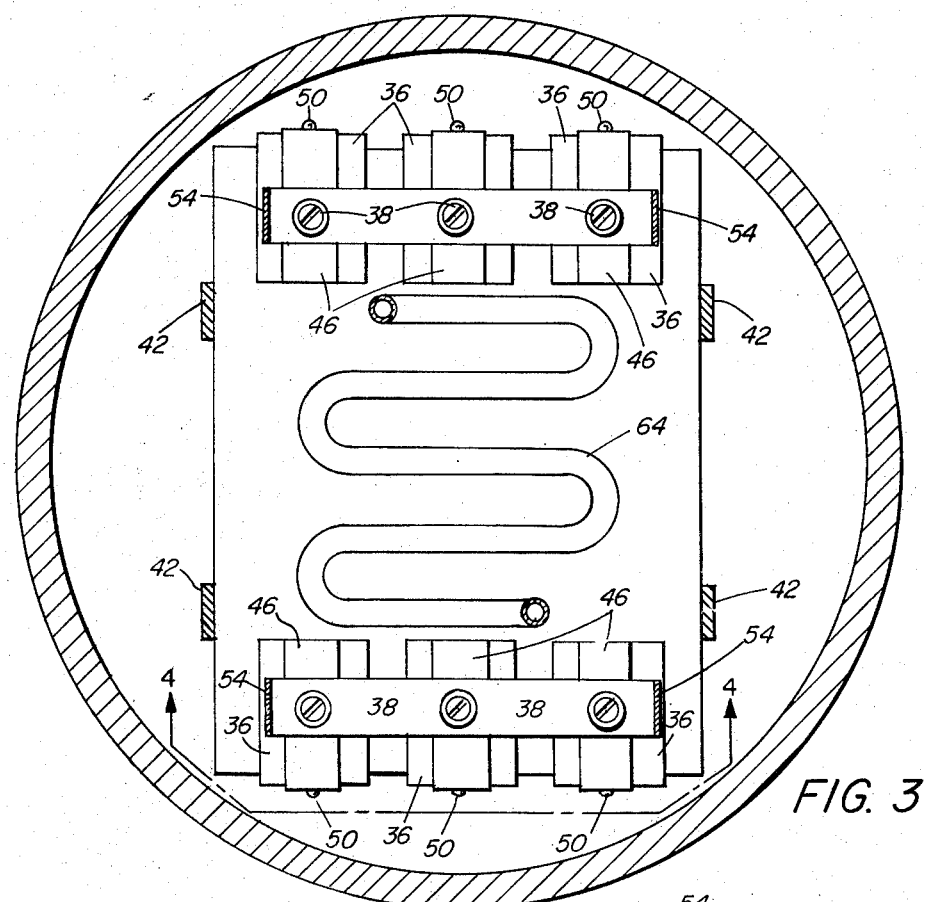
FIG. 3 is a vertical sectional view taken on line 3—3 of FIG. 2.
Figure 4:
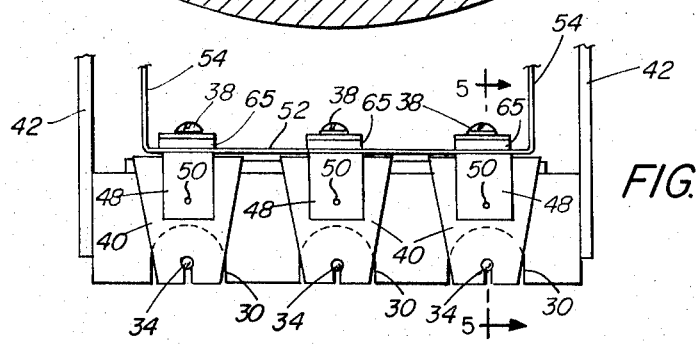
FIG. 4 is an elevational view taken on line 4—4 of FIG. 3 looking in the direction of the arrows.
Figure 5:
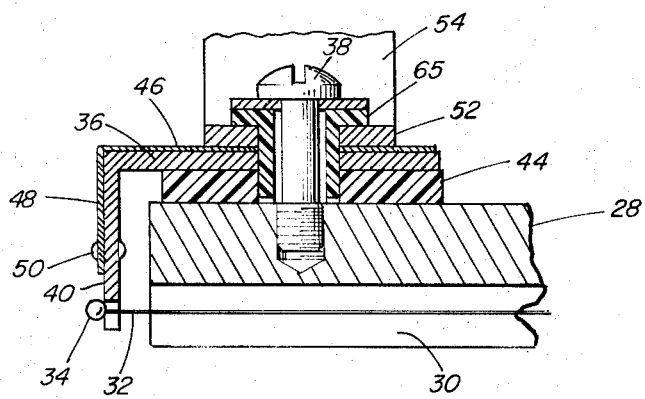
FIG. 5 is an enlarged vertical sectional view taken on line 5—5 of FIG. 4.
Figure 6:
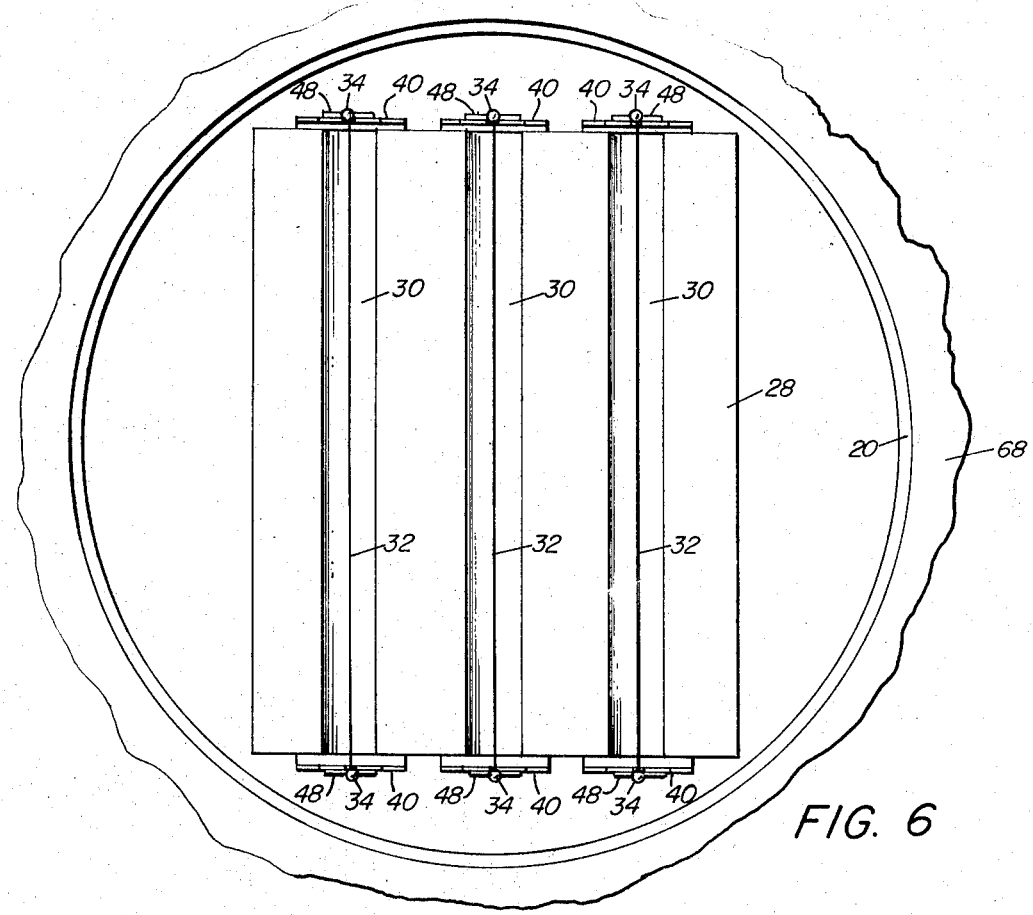
FIG. 6 is an elevational view taken on line 6—6 of FIG. 2 looking in the direction of the arrows.

It will be appreciated that such an electron-generating system will create considerable amounts of heat in the block 28 by radiation from the filaments. Therefore, cooling is provided by disposing coolant tubes or pipes 64 upon the surface of block 28, a shown in FIG. 3, with the ends 66 of the pipes extending through the cap 22, as shown in FIG. 2, for connection to a suitable external source of coolant water, oil, or the like, and pumping means (not shown) therefor as is well known.

The chamber cylinder 18 is provided on its exposed end with an inturned peripheral flange 68 (FIG. 2) upon which is seated a flange 70 which is sealed to the adjacent end of the cylindrical insulating ring 20. Flanges 68 and 70 are bolted tightly together, using conventional O-ring seals (not shown), so that the cathode structure may be easily removed and replaced if desired. Aligning pins 72 or other alignment means carried by one of the flanges are adapted to interfit within holes or other interfitting alignment means in the other flange so that proper alignment of the filaments may be achieved.

Cylinder 18 is in effect an anode and may be provided with means such as a circumferential flange or ring 74 (FIG. 1) which in addition to joining cylinder 18 to chamber 10 serves as an anode terminal for connection to an external circuit. Extending transversely of the cylinder 18 is an anode plate 76 which is preferably formed of copper and which is provided with slots 78 corresponding in number to and aligned with respective ones of the filaments 30 in predetermined spaced relation therewith. When a positive voltage of several thousand volts is applied to the anode relative to the filaments and the control electrode, electrons are drawn from the filaments and combined into ribbon beams 62 which pass through the respective slots 78 and which traverse the work chamber until they impinge upon the workpiece where they give off their kinetic energy which heats the workpiece.

Some of the electrons will strike the edges of the slots 78 in plate 76, creating heat which is dissipated by coolant coils 80 mounted on a surface of the plate. Coils 80 are supplied with coolant by means of piping 82 which passes through the wall of the cylinder 18 for connection to an external source of coolant and pumping means therefor (not shown).

The slots 30 in the control electrode 28 are shaped so that with the control electrode at the same potential as the filament (direct connection), the electric field produced by the potential between the filaments and the anode plate 76 will draw electrons from the filaments and accelerate them towards and through the slots 78 in the anode plate. After passing through the slots 78 the electrons will spread again, either due to side velocity components or due to space charge forces which tend to force electrons apart, so that the electron density becomes essentially uniform at the workpiece. Therefore, the heating of the workpiece will be also essentially uniform. By applying a negative potential to the control electrode 28 relative to the filaments it is possible to improve the beaming or focussing so that most of the electrons drawn from the filaments will pass through the slots 78 and will be utilized for heating of the workpiece. By applying a high negative potential to the control electrode it is possible to cut off the electron flow from the filaments. This feature can be used for regulating the temperature of the workpiece by controlling appropriately the on and off time of the beam.

It has been found that efficient and substantially uniform heating of a workpiece is achieved when the workpiece is placed at varying distances from the filaments, such as twelve, twenty and thirty inches, for example, and when varying potentials, are applied to the anode and cathode electrodes. For example, in one device six effective electron-producing filaments were space at about 0.9 inch intervals within six respective grooves in a cathode block 28. Six slots of about 0.2 inch width were correspondingly provided in anode plate 76. Accelerating voltages up to 10 kv and target currents up to 1.6 A were applied to heat an area in excess of 30 square inches. The area was heated to between 1,000°C and 1,600°C depending on distance and detailed electrical settings. At a target-filament distance of 12 inches it was found that the target or workpiece could be heated to about 1,100°C readily easily with only 3 kv accelerating voltage, whereas at the greater distances somewhat higher voltages were needed as dictated by space charge and beam spreading considerations.

Figure 7:
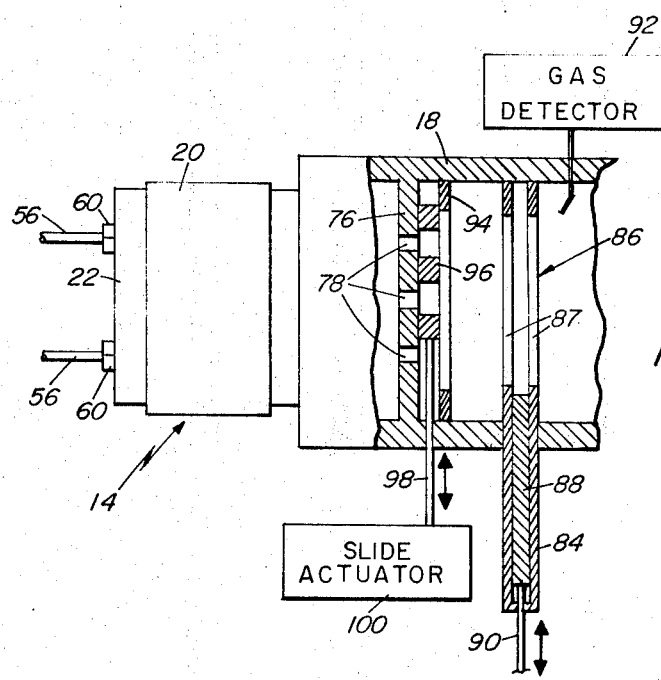
FIG. 7 is a side elevational view partly in section of the electron source chamber.

For such use of the described apparatus, the work chamber 10 was evacuated by attaching outlet 12 to a suitable vacuum pump to obtain a pressure of about 1 to $2 \times 10^{-5}$ Torr. Generally satisfactory operating conditions were obtained from pressures of $5 \times 10^{-6}$ Torr to $1 \times 10^{-4}$ Torr.

Where separate pumping of the work chamber 10 and electron source chamber 14 is desired, as has been described above, a gate valve 84 (FIG. 7) can be mounted in cylinder 18 between the anode plate 76 and the work chamber 10 to close off one chamber from the other so that either one of the chambers can be let to air for maintenance or other purposes without affecting the vacuum in the other chamber. The gate valve 84 may be of any suitable construction. For example, a slideway 86 within the cylinder 18 is apertured at 87 sufficiently to permit the electron beams from the slots 78 in the anode plate 76 to pass freely through. One end of the slideway extends through an opening or slot in the cylinder wall and supports a slide 88. The outer end of the slideway 86 is sealed around a push rod 90 whereby the slide may be moved inwardly to close the aperture 87. Push rod 90 may be moved manually or by any selected electrical or pneumatic mechanism (not shown).

Further, there is also provided means for quickly closing off the electron source chamber 14 from the work chamber 10 when gas bursts appear in the work chamber. For this and other purposes a gas detector or gauge 92 is attached to the work chamber and is operative in response to the gas in the chamber. Slidably disposed on the adjacent side of the anode plate 76 between it and a retainer 94 is a grate 96 which has solid members of a size to close off the slots 78 in plate 76 when the grate is properly positioned. In normal inoperative position the grate is so positioned that the solid members are disposed at one side of the respective slots so as not to interfere with electron flow through the slots. The grate 96 has attached to one side one end of a push rod 98 which extends through the cylinder wall. The outer end of rod 98 is connected to any suitable actuator 100 such as a solenoid or the like which, when actuated, will slide the grate into closing relationship to the slots 78. The actuator 100 itself is connected to the gas detector 92 by any suitable means whereby an activating signal will be transmitted to the actuator 100 from the detector 92 when the detector detects a gas burst. Simultaneous with actuation of the grate the electron beam current is rapidly cut off by applying a high negative cutoff voltage to the control electrode 28. potentials spaced It has been found that the above described electrostatically focussed system works well but that it is difficult to utilize the entire electron emission from the filaments. In the described system the electrons are drawn primarily from the side of the filament which faces the anode plate 76, so that only a fraction of the emission capability of the filaments is utilized, restricting the power which can be generated on the workpiece. In order to utilize a greater part of the emitted electrons, which is essential for producing very high power on the workpiece for rapid heating or high temperatures, it is necessary to keep an auxiliary electrode close to the filament at a sufficiently high positive potential. However, normally such electrodes or accelerating grids would attract a large portion of the electrons which would lead to serve heating of these auxiliary electrodes and not increase the flow to the workpiece. This can be precluded by employing a magnetic focussing field which is aligned in the main direction of the beam. It has been found that such magnetic beaming fields work well if the gun and target are interposed between the magnet pole shoes, which limits, for practical reasons, the gun-to-target distance to relatively small values. Otherwise the magnet becomes too big and expensive.

Figure 8:
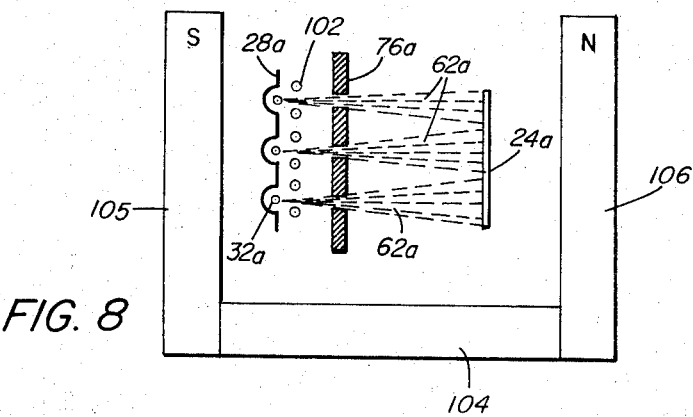
FIG. 8 is a schematic illustration of a magnetically focussed apparatus embodying the invention.

A magnetically focussed system is shown in FIG. 8 in schematic form. The cathode block in this example is depicted as a reflector 28a with the filaments 32a in the slots therein. A slotted anode plate 76a is spaced from the filament array, and an array of grid wires 102 is disposed between the filaments and the anode plate to accelerate electrons from the filaments toward slots in the plate. To aid in focusing the electrons from the individual filaments into respective ribbon beams 62a there is provided a magnet 104 with pole pieces 105-106 disposed outwardly and in spaced relation with respective outer sides of the cathode structure 28a and the workpiece 24a. It has been found that the magnet 104 greatly aids in reducing the current flow to the grid 102 and in focusing the electrons from the filaments into and through the respective slots in the anode plate 76a, thus preventing some of the electron interception by the plate, thereby decreasing anode heating and increasing electron density at the target.

As FIG. 8 illustrates, the magnet is arranged so that the magnetic field lines extend perpendicularly through the plane in which the filaments are located, and also extend perpendicularly through the slotted anode plate and the workpiece. The magnetic field has no effect on electrons which travel parallel to the magnetic field lines and therefore the electrons emitted in the direction of the field lines move in straight lines through the slots to the workpiece. However, any electrons which are emitted at an angle relative to the magnetic field, such as the electrons from the sides of the filaments which would tend to flow towards the grid wires are forced by the magnetic field into helical paths which keep the electrons confined in relatively narrow beams which pass through the appropriate slots 78. An analysis of the electron trajectories for a magnetic field of 700 gauss and a relatively wide range of accelerating grid potentials (+100 to 500 volts relative to the filaments) and anode potentials (5 to 10 kv) has shown that most of the emitted electrons are focussed into ribbon beams which are only a few filament diameters wide.

Figure 9:
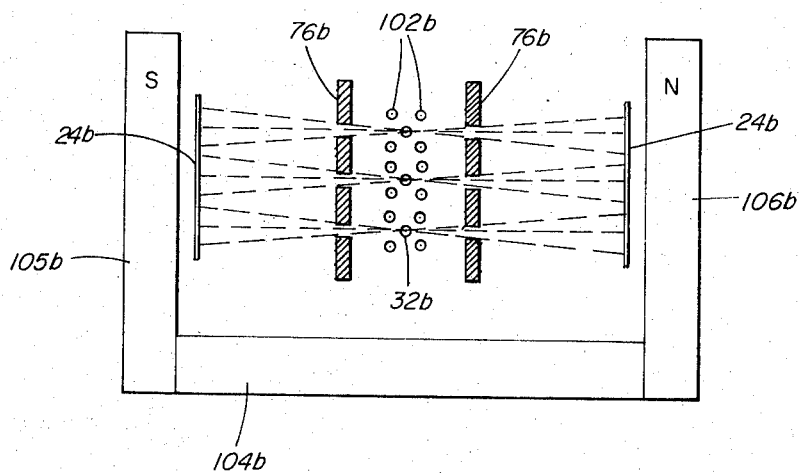
FIG. 9 is a schematic illustration of a double-ended or two-sided apparatus of the type shown in FIG. 8.

In FIG. 9 there is shown a double-ended apparatus wherein two workpieces or targets 24b are supported at opposite ends of the apparatus with a single array of filament wires 32b midway therebetween. Between the filaments and each target are disposed respective slotted anode plates 76b, and between each anode plate and the filaments are disposed respective arrays 102b of grid wires. At each end of the structure is located a respective polepiece 105b–106b of a magnet 104b. Thus, when the apparatus is operated ribbon beams of electrons from the filaments are formed by the magnet and are directed by the grids in respective opposite directions toward and through the anode slots onto the targets.

Figure 10:
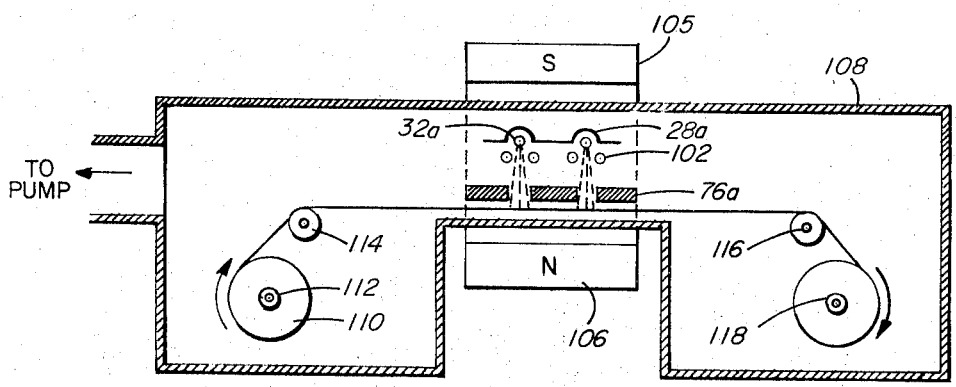
FIG. 10 is a schematic illustration of the apparatus of FIG. 8 utilized with a moving workpiece.

In FIG. 10 the magnetically focussed apparatus of FIG. 8 is utilized in a single chamber structure 108 wherein the workpiece comprises a roll 110 of ribbon-like material which is disposed on a spool 112 from which it is adapted to be unwound, passing over rollers 114 and 116 to a second spool 118 on which it is wound. In passing from roller 114 to roller 116 the target material passes through the target area where it is bombarded by electrons in the manner taught hereinbefore. Any suitable means may be provided for driving the spools and moving the material at a selected rate.

Figure 11:
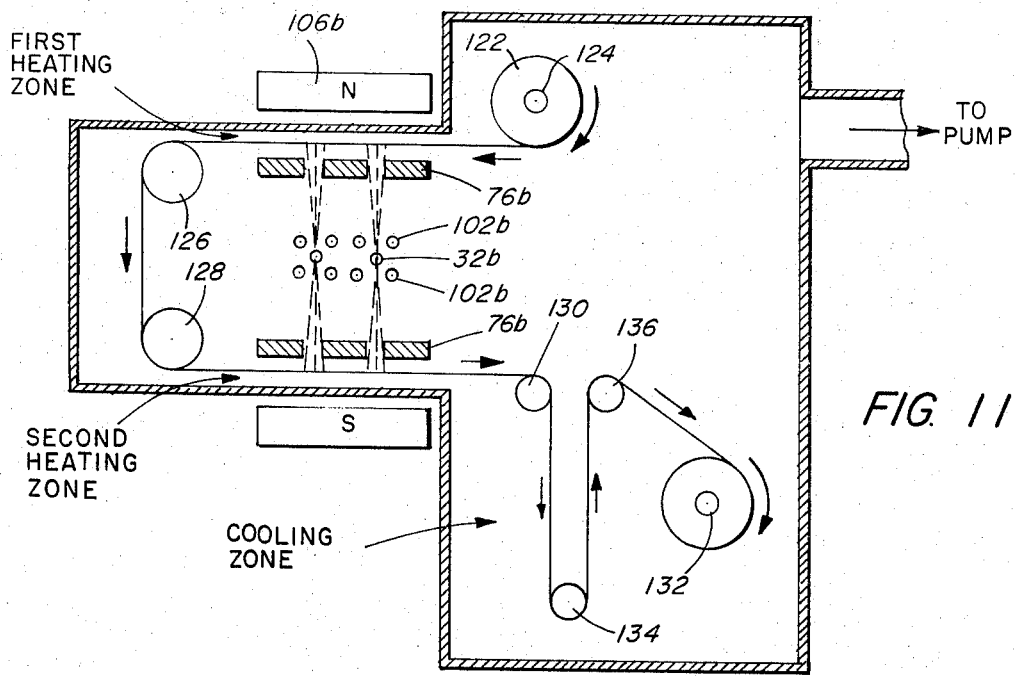
FIG. 11 is a schematic illustration of the apparatus of FIG. 9 utilized with a moving workpiece.

In FIG. 11 the double-ended apparatus of FIG. 9 is utilized in a single chamber structure 120 wherein the workpiece comprises a roll 122 of ribbonlike material which is disposed on a spool 124 from whcih it is adapted to be unwound, passing to a first roller 126. In doing so the material passes through a first heating zone where it is impinged by electrons from one side of the cathode filaments 32b. From roller 126 the strip 122 passes over a second roller 128 to a third roller 130. Between rollers 128 and 130 the material passes through a second heating zone where it is heated for a second time, this time by electrons from the opposite side of filaments 32b. From roller 130 the strip may pass directly to spool 132 or, as is shown, may pass through a cooling zone over a second pair of rollers 134–136 before passing to storage spool 132. In the cooling zone additional accessory means may be provided if desired for lowering the temperature of the heated material as it passes through the cooling zone.

From the foregoing it will be apparent that all of the objectives of this invention have been achieved by the provision of a novel electron beam heating apparatus as described. In accordance with the invention a plurality of static ribbon-shaped undeflected electron beams of relatively low power density are directed simultaneously onto a surface or surfaces of a large area target. The apparatus is structured to provide ready removal and replacement of short-life electron sources, and is provided with the various protective features described.

It will also be apparent that various modifications and changes may be made by those skilled in the art without departing from the spirit of the invention as expressed in the accompanying claims. Therefore, all matter shown and described is to be interpreted as illustrative and not in a limiting sense.

I claim:

1. Electron beam heating apparatus comprising an enclosure having a first portion containing means for supporting work to be heated and a second portion containing an electron gun, said electron gun comprising a plurality of electron emissive filaments for generating respective spaced ribbon-shaped electron beams and a control electrode having elongated cavities therein surrounding the respective filaments for directing the beams without deflection simultaneously onto said work, each of said beams having some amount of spreading and at a known distance from the source means adajcent edges of the beams are joined and form a continuous broad single area of relatively uniform electron density, said work being located at said distance from the source means whereby it is substantially uniformly heated throughout a selected broad area by said electrons, and means for evacuating said enclosure to a predetermined degree.

2. Electron beam heating apparatus comprising a work chamber containing means for supporting work to be heated, and a source chamber connected with said work chamber and adapted to be connected to a source of current and containing therein a source of electrons and means for directing electrons therefrom onto work in said chamber, said source of electrons comprising means for generating simultaneously a plurality of static ribbon-shaped beams, each of said beams having some amount of spreading and at a known distance from said beam generating means adjacent edges of the beams are joined and form a continuous broad single area of relatively uniform electron density, and said work is located at said distance from the beam generating means whereby it is substantially uniformly heated by said electrons.

3. Apparatus as set forth in claim 2 wherein said source of electrons comprises a control electrode having a plurality of parallel grooves in one surface thereof directed toward said work, said beam generating means comprises filaments disposed in respective grooves, and support means for said control electrode is mounted on a portion of said source chamber and is electrically connected to said filaments whereby filament current may be conducted from said portion to the filaments.

4. Apparatus as set forth in claim 5 wherein means is provided for removably connecting said portion of the source chamber to said work chamber to permit interchanging of electron sources.

* * * * *